(12) United States Patent
Sugawara (10) Patent No.: US 6,920,011 B2
(45) Date of Patent: Jul. 19, 2005

(54) RECORDING DEVICE HAVING DISK-SHAPED RECORDING MEDIUM AND SERVO INFORMATION PROCESSING METHOD

(75) Inventor: Nobuhiro Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 10/652,833

(22) Filed: Aug. 29, 2003

(65) Prior Publication Data

US 2004/0090696 A1 May 13, 2004

(30) Foreign Application Priority Data

Sep. 11, 2002 (JP) ........................................ 2002-265075

(51) Int. Cl.$^7$ ............................................ G11B 5/596
(52) U.S. Cl. ..................................................... 360/78.14
(58) Field of Search ................................ 360/77.04, 75, 360/77.07, 77.08, 77.11, 77.14, 78.04, 78.14, 78.05, 48

(56) References Cited

U.S. PATENT DOCUMENTS

| | | | | |
|---|---|---|---|---|
| 4,136,365 A | * | 1/1979 | Chick et al. ............. | 360/78.05 |
| 4,149,199 A | * | 4/1979 | Chick et al. ............. | 360/77.04 |
| 4,530,020 A | * | 7/1985 | Sutton ..................... | 360/77.04 |
| 4,878,135 A | * | 10/1989 | Makino et al. .......... | 360/78.04 |
| 5,825,729 A | | 10/1998 | Ogasawara et al. | |
| 5,844,742 A | * | 12/1998 | Yarmchuk et al. ............ | 360/75 |
| 5,903,404 A | * | 5/1999 | Tsurumi et al. ............... | 360/48 |
| 6,049,516 A | | 4/2000 | Ogasawara et al. | |
| 6,078,460 A | * | 6/2000 | Moriya ..................... | 360/77.04 |
| 6,147,943 A | | 11/2000 | Ogasawara et al. | |
| 6,344,942 B1 | * | 2/2002 | Yarmchuk ..................... | 360/75 |
| 6,747,835 B2 | * | 6/2004 | AbouJaoude et al. ..... | 360/77.04 |
| 6,751,046 B1 | * | 6/2004 | Szita et al. ............... | 360/77.04 |

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

To solve the conventional problem in a disk drive unit that frequent interruptions be produced in a processor each time a head transits on a servo gate.

To cope with the above-mentioned problem, a head drive unit 17 performs an off-track check using servo information read by the head 2 whenever the head 2 transits on each servo gate. Thus, an interruption processing required by the processor 16 is limited to the cases of either an operation completion interruption which is produced when a read/write operation is completed normally, or an error interruption which is produced on occurrence of the off-track or read error. This enables to reduce the number of interruption processing times performed in the processor 16, which results in reducing the load of the processor 16.

4 Claims, 7 Drawing Sheets

RECORDING DEVICE HAVING DISK-SHAPED RECORDING MEDIUM AND SERVO INFORMATION PROCESSING METHOD

FIELD OF THE INVENTION

The present invention relates to a recording device having a disk-shaped recording medium in which servo information is recorded, and a servo information processing method therefor.

BACKGROUND OF THE INVENTION

In a recording device (disk drive unit) having a disk-shaped recording medium in which servo information is recorded, read operation and write operation are performed by moving a head for use in reading and writing data on a plurality of tracks arranged concentrically on a disk-shaped recording medium (disk). Because it is important to move the head along the center of each track, servo information is employed so as to position the head accurately.

In such a sector servo system, the servo information is recorded on the disk surface radially in a radius direction perpendicular to each track. A portion in which the servo information is recorded is referred to as a servo gate. In the servo information, there are included a track number, a servo gate number denoting the location number of the servo gate assigned on a track-by-track basis, and a burst signal for detecting deviation of the head position from the center of the track.

In the conventional read or write operation for a disk drive unit having the aforementioned servo information, whenever the head transits on the servo gates during the read/write operation, it is checked whether the head position does not deviate from the center of the track, based on the servo information. By use of an interruption, a check result is reported to a processor which totally controls the disk drive unit.

When the head position deviates from the center of the track (hereafter this deviation is referred to as 'off-track'), this may possibly corrupt data on a track other than the object track. To prevent such an undesirable situation, the processor identifies the check result preferentially to perform an interruption processing. This causes temporarily suspension of normal control operation. When such an occurrence of the off-track is identified, the processor suspends the ongoing read/write operation.

Meanwhile, with the increase of both data size and application size handled by users, and with the increase of speeds of peripheral units and a central processing unit, there has been demanded a disk drive unit which is larger in capacity and higher in performance than before.

In order to develop a disk drive unit having a larger recording capacity with the unit size unchanged, a high-density disk drive unit has been achieved by decreasing a space between the tracks (track pitch). As a result of a decreased track pitch, there becomes an increased possibility of the data corruption caused by the head accidentally handling a data on a track neighboring an object track. In order to prevent such a malfunction, it has been required for the head to be located with more accuracy, as well as the off-track check be performed more strictly. As a result, the number of servo gates has been increased.

Also, in order to develop a high-performance disk drive unit, there has been an improvement in a data amount to be read out per a unit time by rotating the disk at higher speed. As a result of high-speed disk rotation, there has been an increased number of head transitions across the servo gates in a unit time, as compared to previous cases.

As mentioned above, a high-density disk rotating at high speed has brought about an increase of the servo gates, as well as an increase in the number of head transitions across the servo gates in a unit time. As a result, the number of interruptions against the processor has also been increased. The increased number of interruptions has produced an increased load of the processor, and an increased number of interruptions in the normal control. This has caused a problem of increasing a delay produced in processing other than the interruption processing.

SUMMARY OF THE INVENTION

It is an object of the present invention to decrease the number of interruptions in the processor caused by the head transition across the servo gates, and to reduce the interruption processing load in the processor.

In order to attain the aforementioned object, according to a first aspect of the present invention, there is provided a servo information processing method in a recording device. The recording device includes; a disk-shaped recording medium having tracks arranged in a concentric manner and servo gates each having servo information and being disposed in a radial direction perpendicular to the tracks; a head which writes and reads data, a head drive unit performing head position control according to the servo information; a recording control unit performing data transmission and reception to and from the head and performing write and read control to and from the disk-shaped recording medium; and a processor controlling both the recording control unit and the head drive unit. The servo information processing method includes the steps of: in the head drive unit, checking whether the head is located on an object track based on the servo information read out by the head; in the head drive unit, reporting error information to the processor when the head is not located on the object track; and on completion of data writing, if the head is not located on a servo gate, moving the head to a next servo gate on the same track as the track on which the head is located when the data writing is completed, and checking at the next servo gate whether the head is located on the object track.

According to the second aspect of the present invention, in the aforementioned first aspect of the present invention, a servo gate number is assigned to each servo gate for identification, and the above-mentioned error information includes the servo gate number.

According to the third aspect of the present invention, there is provided a recording device which includes; a disk-shaped recording medium having tracks arranged in a concentric manner and servo gates each having servo information and being disposed in a radial direction perpendicular to the tracks; a head which writes and reads data; a head drive unit performing head position control according to the servo information; a recording control unit performing data transmission and reception to and from the head and performing write and read control to and from the disk-shaped recording medium; and a processor controlling both the recording control unit and the head drive unit. The head drive unit includes; checking whether the head deviates from an object track based on the servo information read out by the head; reporting error information to the processor when the head is determined to have deviated from the object track; on completion of data write processing, when the head is not located on the servo gate, moving the head to a next servo gate on the track on which the head is located when the data writing is completed; and checking at the next servo gate whether the head is located on the object track.

According to a fourth aspect of the present invention, in the aforementioned third aspect of the present invention, the recording device is provided with servo gates. A servo gate number is assigned to each servo gate for identification, and the above-mentioned error information includes the servo gate number.

According to the present invention, in the write or read processing, an interruption processing to be performed by the processor is not required each time the head transits on the servo gates, but is limited to the cases either when an off-track has occurred or when the write or read processing has completed. This enables to reduce the load of the processor.

Also, according to the second aspect of the present invention, when the interruption has been produced by the occurrence of the off-track, there is recorded a servo gate number of the servo gate on which the off-track check was performed. This enables to restart the operation from the point of the off-track, thus preventing from wasting the data having been written or read out. Accordingly, it becomes possible to reduce the load of the processor, compared to writing or reading the data afresh from the start.

Further scopes and features of the present invention will become more apparent by the following description of the embodiments with the accompanied drawings.

DETAILED DESCRIPTION OF THE PREFERRED EMBODIMENT

The preferred embodiment of the present invention is described hereinafter referring to the charts and drawings. However, it is to be noted that the scope of the present invention is not limited to the embodiments described below, but instead embraces all equivalents to the claims described.

Figure 1:
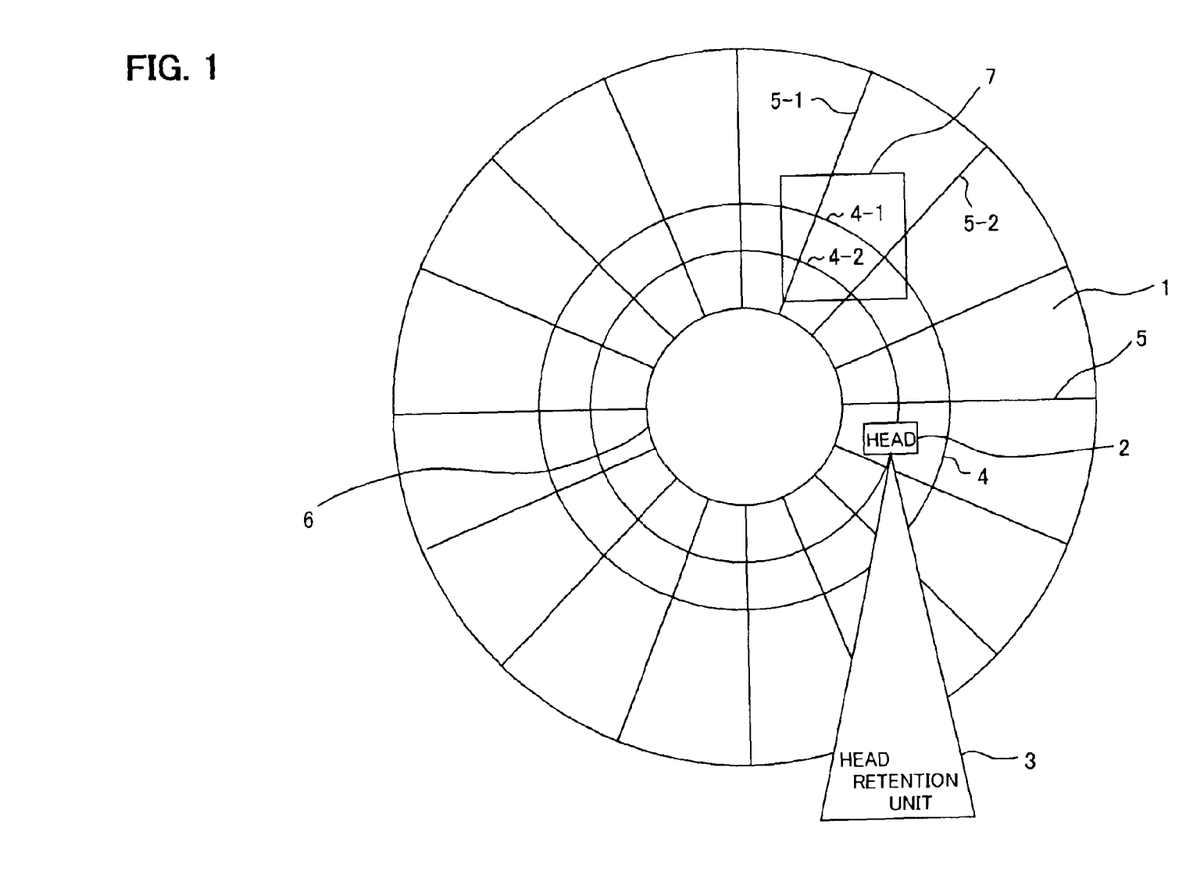
FIG. 1 shows a diagram illustrating a disk incorporating a sector servo system.

FIG. 1 is a diagram illustrating a disk incorporating a sector servo system. In FIG. 1, both write operation and read operation are carried out by a head 2, which is supported by a head retention unit 3, moving on a plurality of tracks 4 disposed in a concentric manner on a disk 1.

A servo gate 5 is disposed radially in a perpendicular direction against tracks 4, and contains servo information recorded thereon. When head 2 transits on servo gate 5, the recorded servo information is read out. The readout servo information is used for moving the head to an object track, and for moving the head along the center of the object track.

In an ordinary disk drive unit, there are disposed a plurality of disks disposed in a multi-layer manner. The disks are rotated around a spindle 6. Although only two tracks are depicted in FIG. 1, a substantially large number of tracks are provided on a practical disk.

Figure 2:
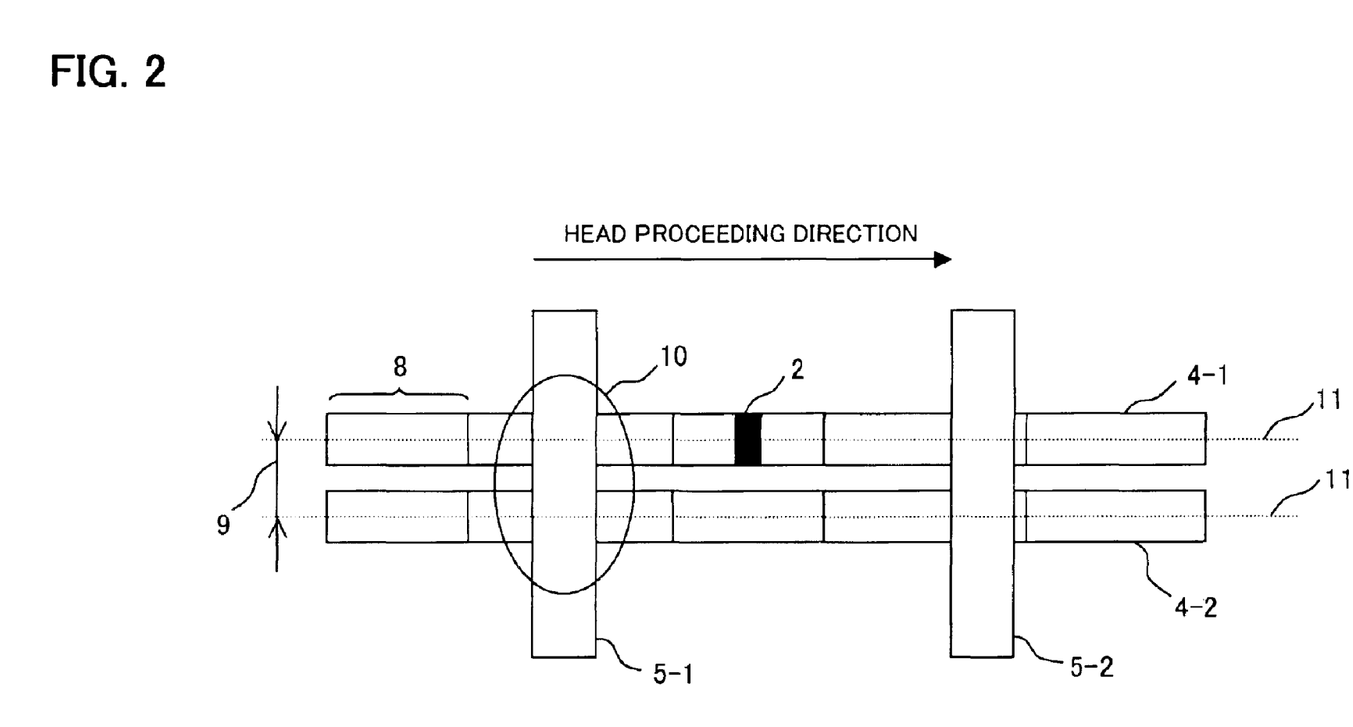
FIG. 2 shows a diagram illustrating a track and a servo gate.

FIG. 2 is a diagram illustrating a track and a servo gate, in which an enlarged diagram of a portion 7 shown in FIG. 1 is illustrated. Corresponding to FIG. 1, tracks 4-1, 4-2 and servo gates 5-1, 5-2 are depicted in FIG. 2. Actually, servo gates 5-1 and 5-2 are not parallel lines, and tracks 4-1 and 4-2 are of arc shape.

Track 4 is further divided into sectors 8 each having an equal data capacity. Sector 8 is an operation unit of write or read operation. Head 2 is controlled so that the center of the head coincides with the center 11 of each track, and that head 2 is moved on the tracks. Tracks 4 are disposed to have a distance between track centers 11 (track pitch 9) so that the tracks are not superposed mutually.

Figure 3:
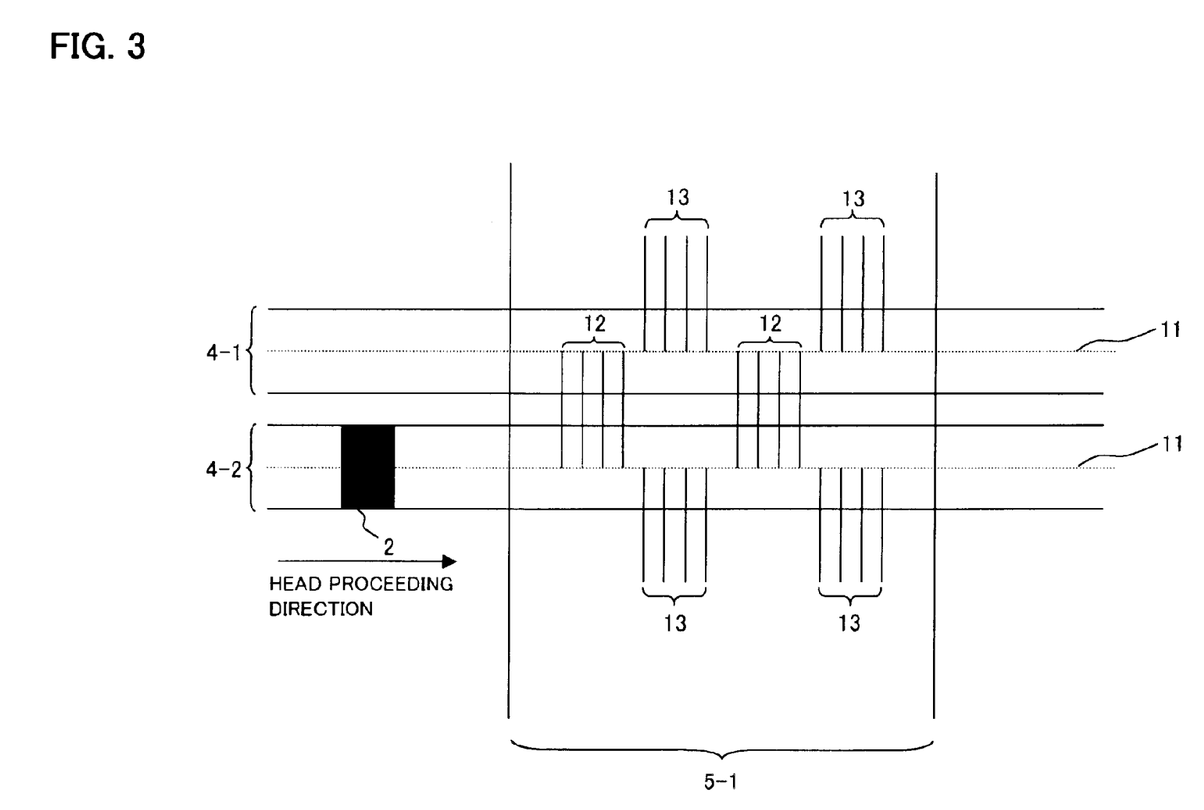
FIG. 3 shows an enlarged diagram of the servo gate for illustrating an off-track check.

FIG. 3 is an enlarged diagram of the servo gate illustrating an off-track check, in which a portion 10 shown in FIG. 2 is enlarged. Corresponding to FIG. 2, there are illustrated tracks 4-1, 4-2 and a sector servo 5-1. In the example shown in FIG. 3, there are recorded two kinds of burst signals 12, 13. These burst signals are alternately located on either side of track center 11, such that each burst signal does not cross track center 11.

When head 2 transits on a burst signal, a signal regenerated by the head is detected as a waveform. When comparing the amplitude of the regeneration signals obtained in head 2 caused by burst signal 12 and burst signal 13, no amplitude difference is produced as long as head 2 transits on track center 11. In other words, a case that the amplitude difference exceeds a certain threshold means head 2 is running off track center 11, which is determined as an off-track condition.

Further, in each servo gate, there are also recorded a servo mark indicating the start of a servo data, a track data, a servo gate number indicating the location of the servo gate concerned, and the like, as servo information, although these are not shown in the figure.

Figure 4:
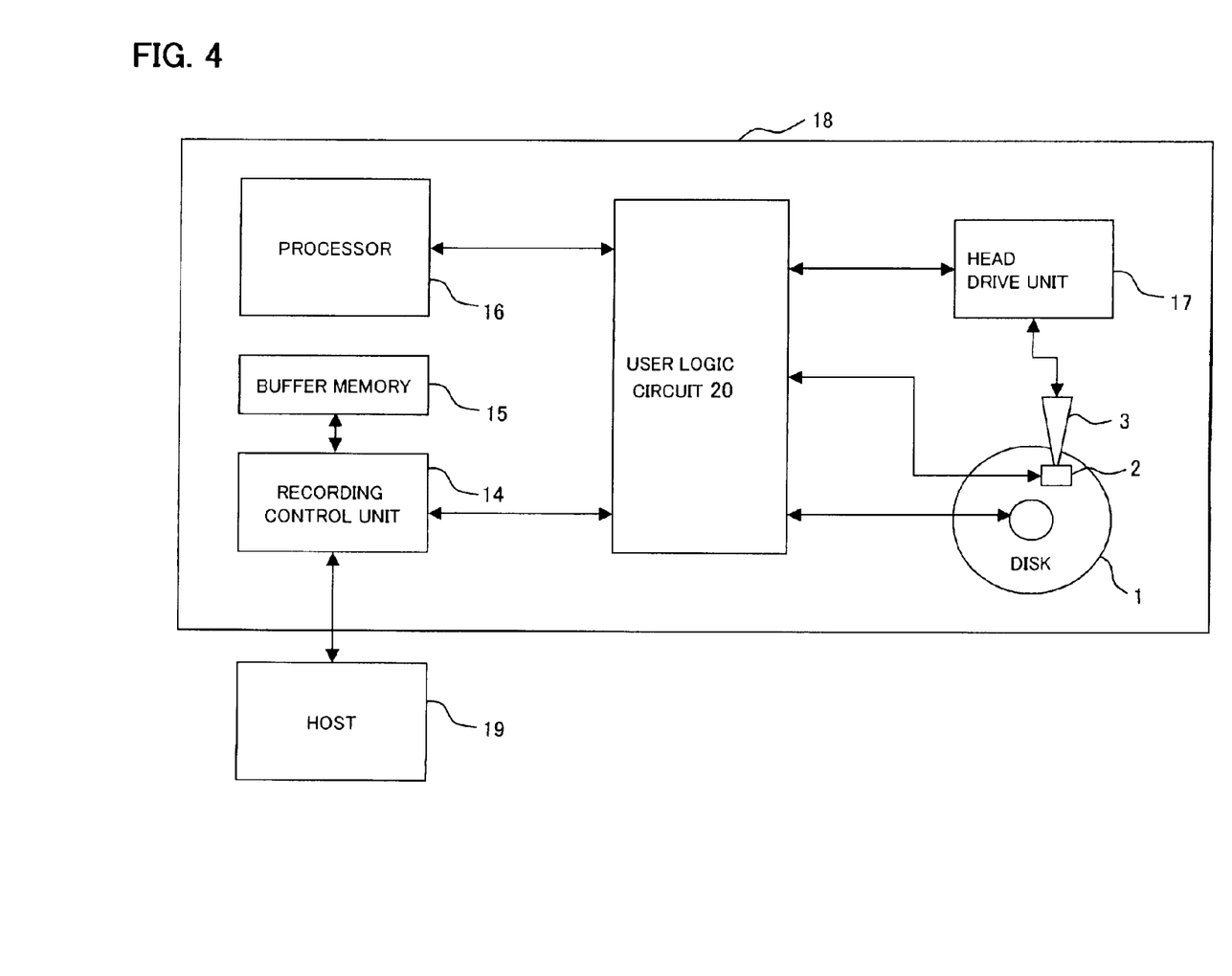
FIG. 4 shows a block diagram illustrating a configuration of a disk drive unit according to an embodiment of the present invention.

FIG. 4 is a block diagram illustrating a configuration of a disk drive unit according to the embodiment of the present invention. In FIG. 4, a host 19 is connected to a disk drive unit 18 through an interface such as the IDE (Integrated Drive Electronics) or the SCSI (Small Computer System Interface). Host 19 issues a write instruction or a read instruction. Such an instruction is received by a recording control unit 14, which is comprised of a CPU and peripheral units.

The write instruction or read instruction received by recording control unit 14 includes location information of disk 1 which determines where the operation is to be started, and either data to be written to disk 1 or the quantity of sectors to be read out. The disk drive unit is configured so that this location information has a data form which is managed by host 19. The track or sector is not specified in this location information.

Therefore, processor 16 converts the data form of the location information managed by host 19 to a form of track and sector information, and thereafter orders head drive unit 17 to move head 2 to an object track and sector. When the movement of head 2 is completed, processor 16 requests recording control unit 14 to start write or read operation.

In case of a write instruction, recording control unit 14 temporarily stores the received write data into a buffer memory 15. Because the head movement to the object track and sector has been completed, recording control unit 14 orders to start write processing. Recording control unit 14 then forwards the write data from buffer memory 15 to head 2. Head 2 records the received write data into disk 1.

In case of a read instruction, recording control unit 14 starts readout processing. On receiving data read out by head 2, recording control unit 14 stores the data into buffer memory 15. When a certain quantity of data is accumulated in buffer memory 15, recording control unit 14 transfers the data concerned to host 19 through the interface.

Figure 5:
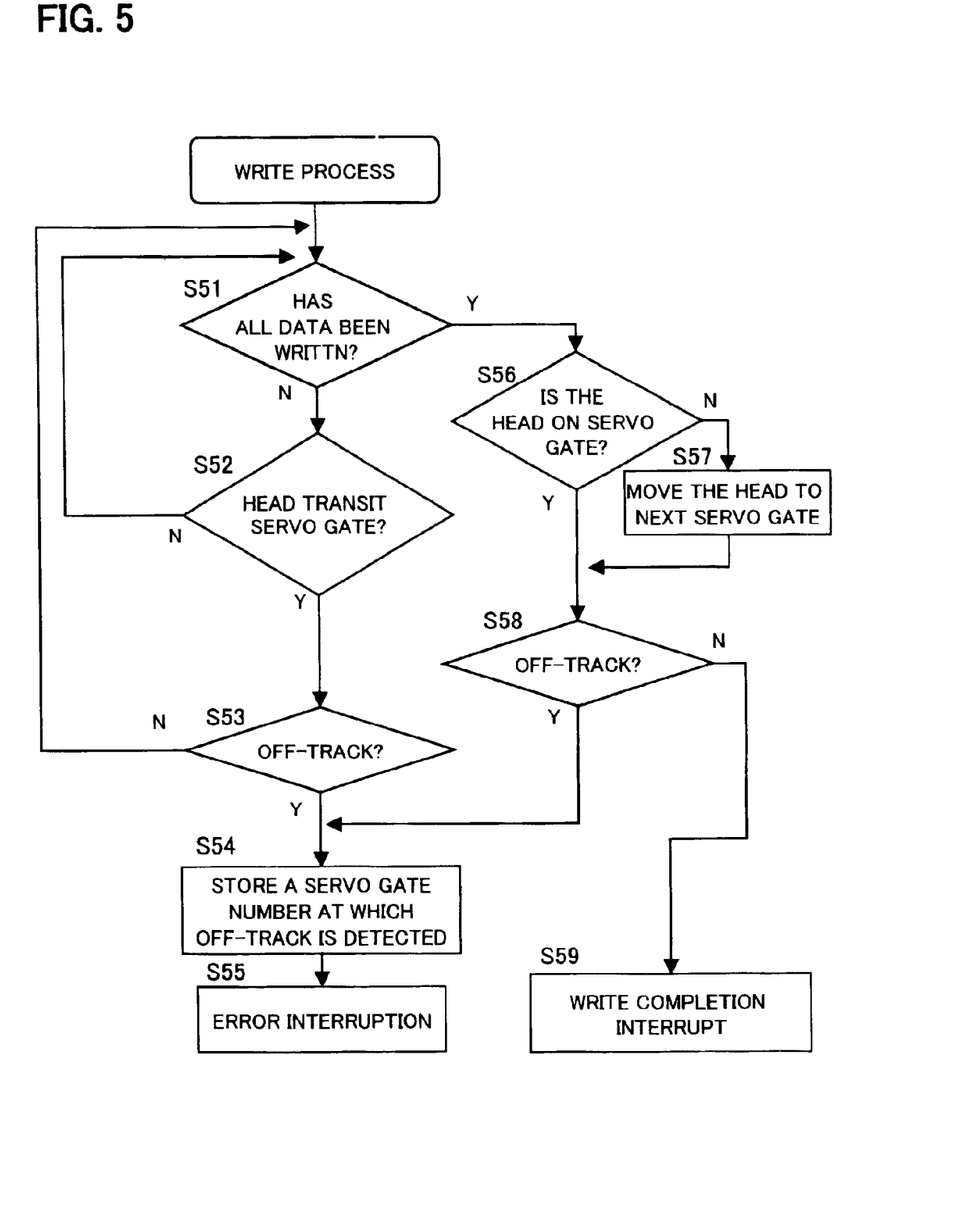
FIG. 5 shows a flowchart illustrating a servo information processing in write processing according to the present invention.

Now, hereafter, servo information processing in accordance with the present invention will be described in respect of data write processing and data read processing in order. FIG. 5 is a flowchart illustrating a servo information processing in the write processing in accordance with the present invention. In the write processing, when head 2 transits on servo gate 5, head drive unit 17 performs a off-track check based on the servo information. The check result is forwarded to a user logic circuit 20. User logic circuit 20 verifies the check result, and when the off-track is identified, an interruption is produced against processor 16.

In FIG. 5, first, recording control unit 14 checks whether the data has completely been written (S51). Normally, a write instruction transferred from host 19 includes information representing the quantity of data to be written. Therefore, it is checked whether the data being written exceeds the quantity of data specified in the write instruction.

In step S51, if the data writing has not been completed, recording control unit 14 orders head 2 to write data. Recording control unit 14 reads out data from buffer memory 15 and forwards the data to head 2. Head 2 then records the received data into disk 1. Upon completion of writing the entire data in buffer memory 15, recording control unit 14 requests host 19 to transfer remaining write data. In such a way, recording control unit 14 manages buffer memory 15 so that write data is stored in buffer memory 15 as far as remaining write data exists.

Next, head drive unit 17 checks whether head 2 transits on servo gate 5 (S52). Servo information is forwarded to head drive unit 17 when head 2 transits on servo gate 5. Therefore, the above check can be performed by checking whether the servo information has been received. If head 2 does not transit on servo gate 5, the process returns to step S51, and the write operation is continued.

In step S52, if head 2 transits on a servo gate, head drive unit 17 performs an off-track check. The check result is forwarded to user logic circuit 20 together with the servo gate number (S53). This off-track check is carried out in the same way as described in FIG. 3. It is identified whether the center position of head 2 does not deviate from the center position of track 4. When the off-track condition is not detected, the process returns to step S51 and the write operation is continued.

When the received check result indicates the occurrence of the off-track condition, the corresponding servo gate number is stored in the user logic circuit (S54). The servo gate number has been included in the received check result. And the user logic circuit has a storage device like a register. Therefore, the servo gate number is recorded into the storage device included in user logic circuit. Step S54 enables to specify the servo gate in which the off-track condition occurred.

Thereafter, user logic circuit 20 produces an error interruption against processor 16 (S55), and then the write processing is terminated. The data forwarded in the event of the error interruption includes a data indicating the occurrence of the off-track condition in the midst of the write operation, and the recorded servo gate number in which the off-track condition has occurred, which was previously reserved in step S54.

Upon receipt of the error interruption, processor 16 performs an interruption processing. The contents of the interruption processing depend on the devices. For example, the interruption processing may be; to start the write operation afresh from the start, or restart the preceding write from a point where the error occurred, to overwrite another new data, to delete the data already written for writing new data, to perform other processing than writing, or the like. A suitable operation can be selected from among such choices as exemplified above.

In step S51, when the entire data writing is completed, head-drive unit 17 checks whether head 2 is located on servo gate 5 at the time point of write completion (S56). This check is performed, in a similar way to step S52, by checking whether the servo information has been received when completing the final data writing.

Figure 6:
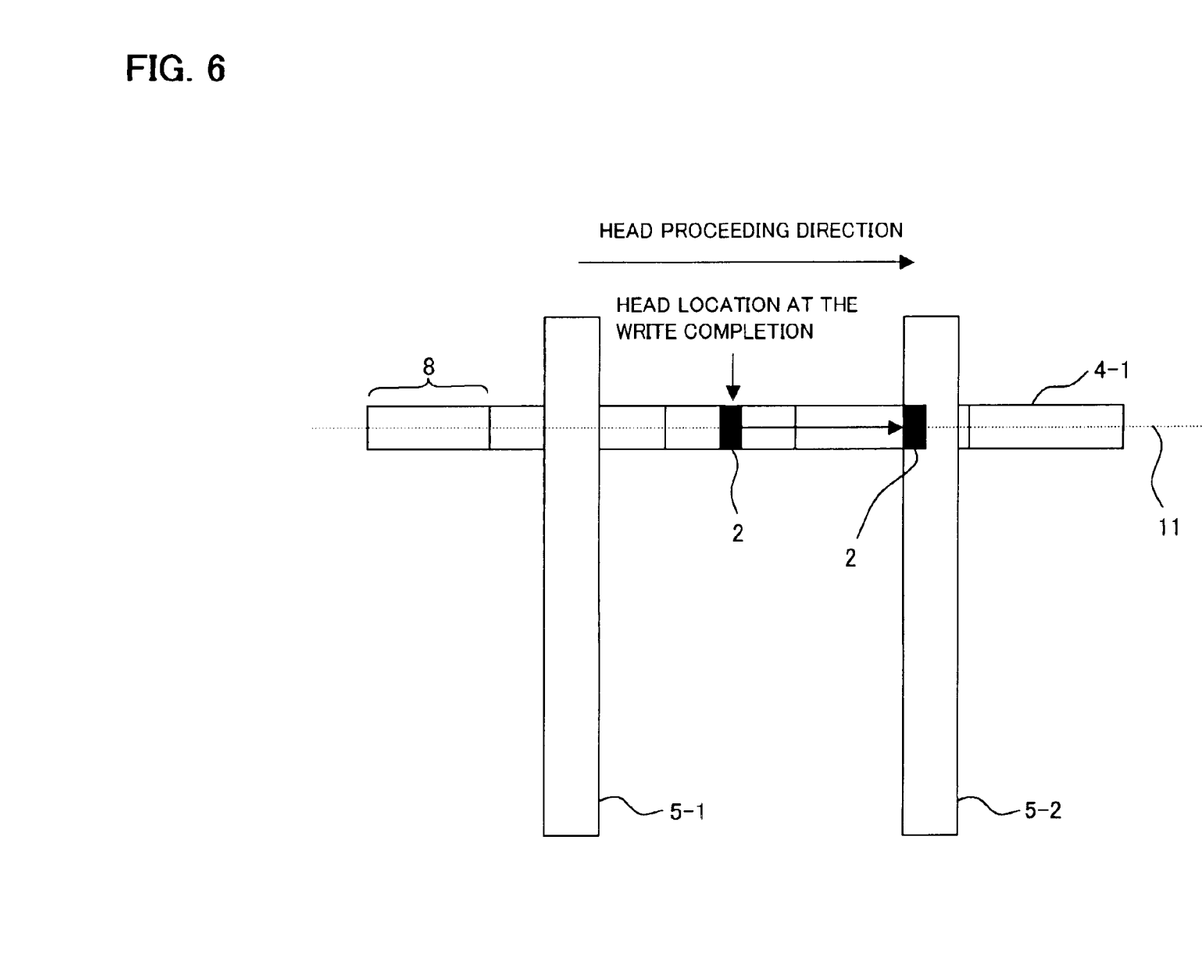
FIG. 6 shows a diagram illustrating a case of the head positioning between the servo gates when the write processing is completed.

FIG. 6 is a diagram illustrating a case that the head is located between the servo gates when the write processing is completed. As shown in FIG. 6, if head 2 is located in a position between servo gates 5-1 and 5-2 on track 4-1 at the time point of write completion, it is not possible to identify whether any off-track condition has occurred while head 2 moves from servo gate 5-1 to the head position at the time of write completion.

To cope with this case, if head 2 is not located on a servo gate at the time point of write completion, head drive unit 17 issues an order to move head 2 to the next servo gate 5 on which the head is located at the time of write completion on the identical track. For example, in FIG. 6, head 2 is moved to servo gate 5-2 on track 4-1.

Subsequently, head drive unit 17 performs the off-track check based on the servo information read out by head 2, and forwards both the check result and the servo gate number to user logic circuit 20 (S58). This off-track check method is the same as illustrated in FIG. 3. In step S58, when the off-track condition is determined, it is regarded that this off-track condition has occurred at a position between the servo gate on which head 2 has transited most recently and the head position at the time of write completion. The process then proceeds to steps S54 and S55, and an error interruption is produced. In step S58, if it is determined any off-track condition has not occurred, writing is completed normally. User logic circuit 20, which has received a write completion signal from recording control unit 14, produces a write completion interruption against processor 16 (S59), and the write processing is completed.

According to the present invention, in the aforementioned servo information processing during the write processing, if no off-track condition occurs, no interruption is produced against processor 16 even at the time head 2 transits on servo gate 5. Accordingly, it becomes possible for processor 16 to continue normal processing without suspending the processing caused by the interruptions which may otherwise occur frequently.

In addition, in the event of off-track, processor 16 records the number of the servo gate which has encountered the off-track condition. This enables a prompt error processing. An example of the error processing is to restart the write operation from a few servo gates before the recorded servo gate number.

Figure 7:
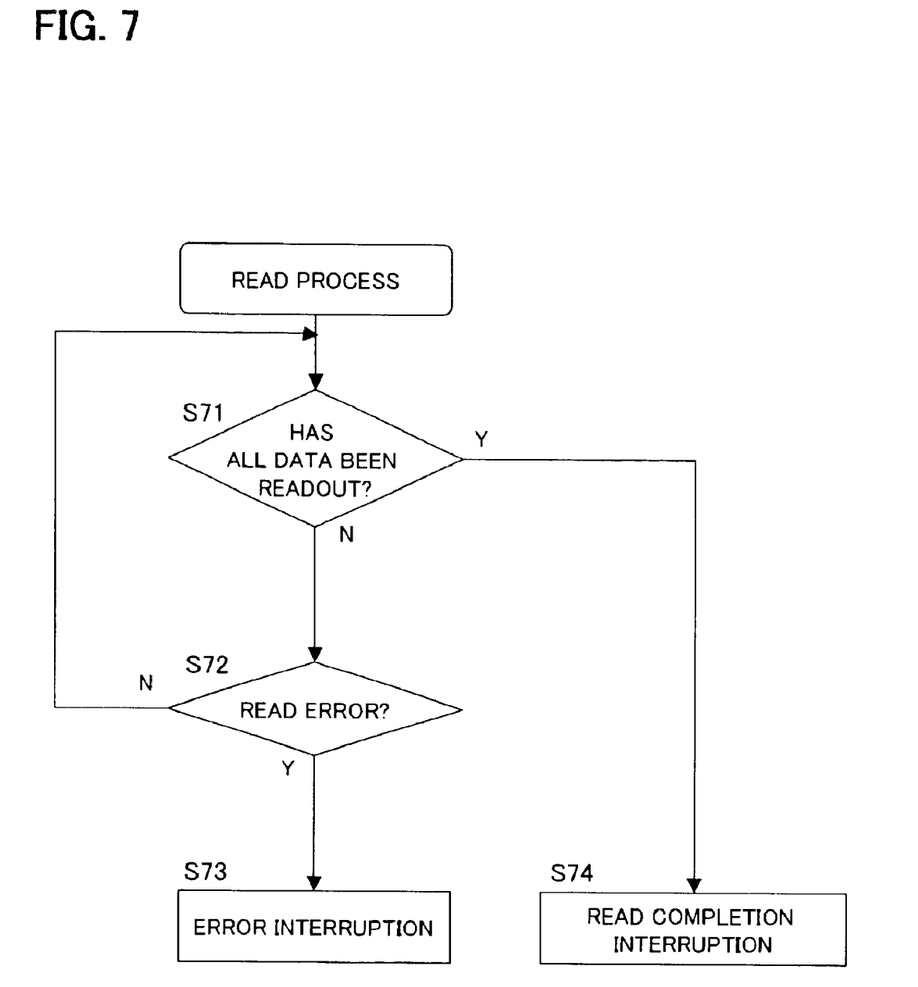
FIG. 7 shows a flowchart illustrating the servo information processing in read processing according to the present invention.

Next, the servo information processing in accordance with the present invention in case of the read processing will be described below. FIG. 7 is a flowchart illustrating the servo information processing in the read processing according to the present invention. In the read processing, there is no need of checking an off-track condition. The validity of data is guaranteed when the read processing is completed without an error. When there is determined any read error, an interruption is produced against processor 16.

In FIG. 7, first, recording control unit 14 checks whether the entire object data have been read out (S71). More specifically, recording control unit records the quantity of the read data forwarded to host 19 after the read instruction was received. Recording control unit 14 then determines whether the read data quantity reaches the number of sectors specified in the read instruction.

If the entire data has not been read out, recording control unit 14 issues an order to head drive unit 17 to read the remaining data. Head 2 then reads out the data, and the readout data is forwarded to recording control unit 14. Recording control unit 14 then stores the received data into buffer memory 15. When a predetermined quantity of data has been accumulated, recording control unit 14 starts data transfer to host 19. In such a way, recording control unit 14 manages buffer memory 17.

Next, it is checked whether any read error has occurred during reading in step S71 (S72). In this step S72, if no read error has occurred, the process returns to step S71 and the reading is continued. If it is determined in step S72 that a read error has occurred, user logic circuit 20 produces an error interruption against processor 16 (S73) and the read processing is terminated.

Meanwhile, if the entire data has been read out in step S71, recording control unit 14 produces an operation completion interruption against processor 16 through user logic circuit 20 (S74), and the read processing is completed. In case of the read operation, the read data includes track information and sector information in which the data are recorded. It is possible to detect an off-track condition deviating from an object track even at the positions other than the servo gates. Therefore, differently from the write processing, it is not necessary to perform any off-track check at the time of read completion.

According to the present invention, in the read processing, it becomes possible to improve on cases of undesirable interruptions produced against processor 16 each time the head transits on the servo gates in response to a read instruction from the host. In contrast, according to the present invention, interruptions occur either when an error caused by the off-track condition occurs or when a readout operation is completed.

Accordingly, it is possible to reduce the load of processor 16, which may otherwise be required for performing interruption processing to investigate servo information. This enables to reduce influences to other control functions, resulting in improving efficiency of processor 16.

Further, though not shown in FIG. 4, user logic circuit 20 provides a register which may include a bit indicating either write processing or read processing in progress. The register is set depending on whether an instruction received from processor 16 is the write processing or the read processing, and user logic circuit 20, referring to the registry, performs the processing.

With this means, it becomes possible to switch the processing performed by user logic circuit 20. This enables to implement both write processing and read processing by use of a single unit.

In addition, it may be possible to incorporate the function of user logic circuit 20 illustrated in the embodiment of the present invention, for example, in head drive unit 17.

To summarize, the present invention effectively brings about reducing the load of processor 16 because processor 16 performs interruption processing only once, that is, either an error interruption processing in the event of the off-track condition, or an operation completion interruption. Thus, it becomes possible to eliminate occurrence of delay during normal control which may possibly be suspended because of the interruption processing.

Further, in the event of error interruption, it becomes possible to identify the error location by recording the number of the servo gate on which the head has transited most recently. By restarting the operation from near (before or after) the error location, it becomes possible to prevent from wasting data which have already been written or read out.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A servo information processing method in a recording device including a disk-shaped recording medium having tracks arranged concentrically and servo gates each having servo information and being disposed in a radial direction perpendicular to the tracks, a head which writes and reads data, a head drive unit performing head position control according to the servo information, a recording control unit performing data transmission and reception to and from the head and performing write and read control to and from the disk-shaped recording medium, and a processor controlling both the recording control unit and the head drive unit, said servo information processing method comprising the steps of:

in the head drive unit, checking whether the head is located on an object track based on the servo information read out by the head;

in the head drive unit, reporting error information to the processor when the head is not located on the object track; and     on completion of data writing, if the head is not located on a servo gate, moving the head to a next servo gate on the same track as the track on which the head is located when the data writing is completed, and checking at the next servo gate whether the head is located on the object track.

2. The servo information processing method according to claim 1, wherein said servo gate is respectively assigned a servo gate number for identification, and the error information includes the servo gate number.

3. A recording device comprising:

a disk-shaped recording medium having tracks arranged concentrically and servo gates each having servo information and being disposed in a radial direction perpendicular to the tracks,     a head which writes and reads data,     a head drive unit performing head position control according to the servo information,     a recording control unit performing data transmission and reception to and from the head and performing write and read control to and from the disk-shaped recording medium, and a processor controlling both the recording control unit and the head drive unit, wherein said head drive unit checks whether the head deviates from an object track based on the servo information read out by the head;

the head drive unit reports error information to the processor when the head is determined to have deviated from the object track; and on completion of data write processing, if the head is not located on the servo gate, the head drive unit moves the head to a next servo gate on the track on which the head is located when the data writing is completed, and checks at the next servo gate whether the head is located on the object track.

4. The recording device according to claim 3, wherein said servo gate is respectively assigned a servo gate number for identification, and the error information includes the servo gate number.

* * * * *